United States Patent
Hiraishi et al.

(10) Patent No.: US 6,500,882 B1
(45) Date of Patent: Dec. 31, 2002

(54) FLAME-RETARDANT, FLAME-RETARDANT RESIN COMPOSITION AND MOLDED ARTICLE THEREOF

(75) Inventors: Wataru Hiraishi, Takamatsu (JP); Makoto Yoshii, Takamatsu (JP); Yoshiharu Sawa, Takamatsu (JP); Tomoko Tachifuji, Takamatsu (JP)

(73) Assignee: Kyowa Chemical Industry Co., Ltd., Kagawa-ken (JP)

( * ) Notice: Subject to any disclaimer, the term of this patent is extended or adjusted under 35 U.S.C. 154(b) by 0 days.

(21) Appl. No.: 09/612,210

(22) Filed: Jul. 7, 2000

(30) Foreign Application Priority Data

Jul. 12, 1999 (JP) ............................................ 11-197873

(51) Int. Cl.[7] ............................ C08K 3/22; C08K 9/10; C08K 9/04; H01B 7/00
(52) U.S. Cl. ................................ 523/205; 174/110 SR; 174/110 PM; 524/436; 524/437
(58) Field of Search .................................. 523/210, 205; 524/436, 437; 174/110 SR, 110 PM

(56) References Cited

U.S. PATENT DOCUMENTS

| | | | |
|---|---|---|---|
| 3,773,708 A | * 11/1973 | Takahashi et al. | 523/205 |
| 3,832,326 A | * 8/1974 | North et al. | 524/437 |
| 4,076,878 A | * 2/1978 | Norby | 428/425 |
| 4,098,762 A | * 7/1978 | Miyata et al. | 524/436 |
| 4,124,562 A | * 11/1978 | Yui et al. | 523/205 |
| 4,373,039 A | * 2/1983 | Mueller et al. | 523/205 |
| 4,375,526 A | * 3/1983 | Zupanovich et al. | 524/436 |
| 4,396,730 A | * 8/1983 | Imahashi et al. | 523/205 |
| 4,420,580 A | * 12/1983 | Herman | 524/436 |
| 4,430,248 A | * 2/1984 | Rey | 524/436 |
| 4,853,154 A | * 8/1989 | Icenogle et al. | 523/205 |
| 4,869,848 A | * 9/1989 | Hasegawa et al. | 174/110 SR |
| 4,891,399 A | * 1/1990 | Ohkawa et al. | 523/212 |
| 4,981,882 A | * 1/1991 | Smith et al. | 523/110 SR |
| 5,139,875 A | * 8/1992 | Metzemacher et al. | 524/436 |
| 5,340,867 A | * 8/1994 | Yagawa et al. | 523/205 |
| 5,514,837 A | * 5/1996 | Kenny et al. | 174/110 PM |
| 5,525,757 A | * 6/1996 | O'Brien | 174/110 SR |
| 5,786,415 A | * 7/1998 | Blanchard et al. | 524/426 |
| 5,959,017 A | * 9/1999 | Eck et al. | 524/436 |
| 6,025,421 A | * 2/2000 | Atarashi et al. | 523/205 |
| 6,239,194 B1 | * 5/2001 | Standke et al. | 523/205 |

FOREIGN PATENT DOCUMENTS

| | | |
|---|---|---|
| EP | 0 426 196 | 5/1991 |
| EP | 0 731 136 | 9/1996 |
| JP | 2293317 | 12/1990 |

* cited by examiner

*Primary Examiner*—Peter Szekely
(74) *Attorney, Agent, or Firm*—Wenderoth, Lind & Ponack, L.L.P.

(57) ABSTRACT

A flame-retardant for a synthetic resin, which is obtained by surface-treating a magnesium hydroxide with an emulsion of a copolymer or polymer of the formula (1),

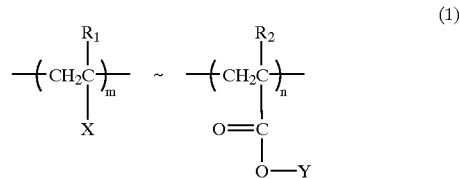
(1)

wherein X is hydrogen, a phenyl group, etc., Y is an alkyl group, etc., each of $R_1$ and $R_2$ is hydrogen, an alkyl group, etc., m is 0 or a positive integer, n is a positive integer, and "~" shows the polymerization state of a main chain, the formula (2),

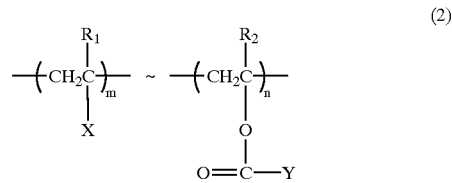
(2)

wherein X, Y, etc. are as defined in the formula (1), or the formula (3),

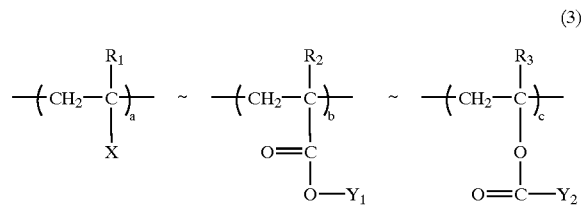
(3)

wherein X and "~" are as defined in the formula (1), each of $Y_1$ and $Y_2$ is hydrogen, an alkyl group, etc., each of $R_1$, $R_2$ and $R_3$ is hydrogen or an alkyl group, and each of a, b and c is a positive integer, a resin composition containing said flame-retardant and a molded article thereof.

5 Claims, No Drawings

FLAME-RETARDANT, FLAME-RETARDANT RESIN COMPOSITION AND MOLDED ARTICLE THEREOF

FIELD OF THE INVENTION

The present invention relates to a flame-retardant, a flame-retardant resin composition and its use, particularly its use as a cable. More specifically, it relates to a flame-retardant which is obtained by surface-treating a metal hydroxide with an emulsion of a copolymer or polymer and can provide a flame-retardant resin composition excellent in processability and acid resistance, a flame-retardant resin composition containing said flame-retardant, a molded article of said flame-retardant resin composition and use of said molded article, particularly use as a flame-retardant cable.

PRIOR ART OF THE INVENTION

A halogen-containing flame-retardant which is obtained from an organic halogen compound, antimony trioxide or a combination of an organic halogen compound and antimony trioxide, has caused a problem socially, since it generates a great deal of smoke and poisonous gases in fire. Therefore, there have been vigorously made development works for a flame-retardant with the smallest amount of the halogen-containing flame-retardant. Consequently, there have been obtained estimation that an inorganic compound, particularly a metal hydroxide typified by magnesium hydroxide or aluminum hydroxide, is an effective flame-retardant. A resin composition containing a metal hydroxide causes little smoke in fire and it is nonpoisonous. Further, when aluminum hydroxide is used, there is found a phenomenon that part of the aluminum hydroxide itself is dehydrated and decomposed at a processing temperature of a resin to cause bubbles in a resin molded article. However, magnesium hydroxide is free from such a phenomenon so that many resins are suitable for use.

A synthetic resin containing a flame-retardant composed of magnesium hydroxide or aluminum hydroxide in a high concentration is broadly used for electric wires in nuclear plants, ships, vehicles, subways and communications lines, parts of home electric appliances and electronic devices, construction materials and so on.

However, when a product containing magnesium hydroxide is subjected to an acid rain or a highly humid condition a for a long time, the problem is that the magnesium hydroxide reacted with carbonic acid, etc., is precipitated in the form of magnesium carbonate or basic magnesium carbonate to whiten a surface and impair the appearance of a molded article. Further, the magnesium hydroxide in a resin gradually moves to the surface of a product, which decreases inherent flame retardancy. Products containing magnesium hydroxide which is a polarity material in a large amount are poor in water-resistance. When these products are subjected to water for a long period of time, the volume resistivity thereof which shows electric properties is decreased. Therefore, the kind of a usable electric wire is limited. When attempts to give sufficient flame-retardancy to a resin with a metal hydroxide are carried out, it is required to incorporate the metal hydroxide into the resin in a high concentration. Consequently, the problem is that processability (productivity) becomes poor. That is, when the metal hydroxide is incorporated into the resin, the problem is that the processability, water-resistance and acid resistance of a resin composition and a molded article thereof deteriorate.

There are proposed flame-retardants surface-treated with higher fatty acids, alkaline metal salts thereof, or various coupling agents such as a silane-containing coupling agent and a titanium-containing coupling agent. The water-resistance and acid-resistance are improved to some extent depending upon the kind of a surface-treating agent. However, the flow of a resin composition in an extruder is impaired. That is, the processability becomes poor. Further, depending upon the kind of a surface-treating agent, processability is improved but water-resistance and acid-resistance are decreased. On this account, the use of the surface-treating agent has not overcome the above problems.

SUMMARY OF THE INVENTION

It is an object of the present invention to provide a flame-retardant which overcomes the above problems and can give a flame-retardant resin composition excellent in acid resistance, water resistance and processability, a flame-retardant synthetic resin composition containing said flame-retardant and a molded article of said resin composition.

According to the present invention, there is provided a flame-retardant for a synthetic resin, which is obtained by surface-treating a magnesium hydroxide with an emulsion of a copolymer or polymer of the formula (1),

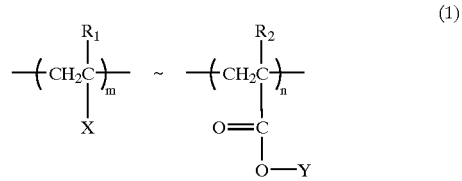

(1)

wherein X is any one of hydrogen, a phenyl group and an alkyl phenyl group, Y is hydrogen, an alkyl group or an organic group having a functional group, each of $R_1$ and $R_2$ is hydrogen or an alkyl group, m is 0 or a positive integer, n is a positive integer, and "~" shows that each monomer is copolymerized at random in a main chain, the formula (2),

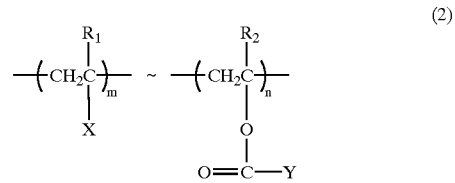

(2)

wherein X is any one of hydrogen, a phenyl group and an alkyl phenyl group, Y is hydrogen, an alkyl group or an organic group having a functional group, each of $R_1$ and $R_2$ is hydrogen or an alkyl group, m is 0 or a positive integer, n is a positive integer, and "~" shows that each monomer is copolymerized at random in a main chain, or the formula (3),

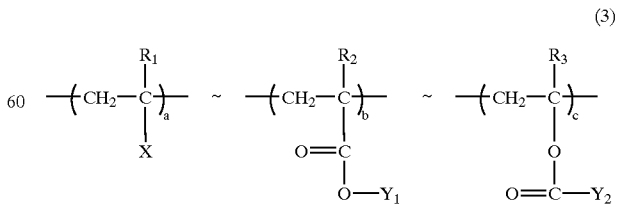

(3)

wherein X is any one of hydrogen, a phenyl group and an alkyl phenyl group, each of $Y_1$ and $Y_2$ is hydrogen, an alkyl group or an organic group having a functional group, each of $R_1$, $R_2$ and $R_3$ is hydrogen or an alkyl group, each of a, b and c is a positive integer, and "~" shows that each monomer is copolymerized at random in a main chain.

The present invention relates to a flame-retardant, a flame-retardant resin composition and its use, particularly its use as a cable. More specifically, it relates to a flame-retardant which is obtained by surface-treating a magnesium hydroxide with an emulsion of a copolymer or polymer and can provide a flame-retardant resin composition excellent in processability and acid resistance, a flame-retardant resin composition containing said flame-retardant, a molded article of said flame-retardant resin composition and use of said molded article, particularly use as a flame-retardant cable.

According to the present invention, there is further provided a molded article obtained from the above flame-retardant resin composition.

According to the present invention, there is further provided a flame-retardant cable in which an electrical conductor is covered with an insulation layer directly or through another layer or in which the circumference of the above insulation layer is covered with a sheath layer through further another layer or through no layer, wherein at least one layer of the insulation layer or the sheath layer is composed of the above molded article.

The flame-retardant of the present invention is obtained by surface-treating a magnesium hydroxide with an emulsion of a copolymer or a polymer of the formula (1),

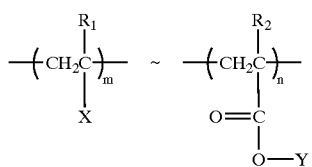

(1)

wherein X is any one of hydrogen, a phenyl group, and an alkyl phenyl group, Y is hydrogen, an alkyl group or an organic group having a functional group such as a vinyl group or an epoxy group, each of R, and R, is hydrogen or an alkyl group, m is 0 or a positive integer, n is a positive integer, and "~" shows that each monomer is copolymerized at random in a main chain, the formula (2),

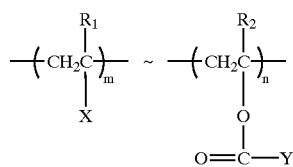

(2)

wherein X, Y, $R_1$, $R_2$, m, n, and "~" are as defined in the formula (1), or the formula (3),

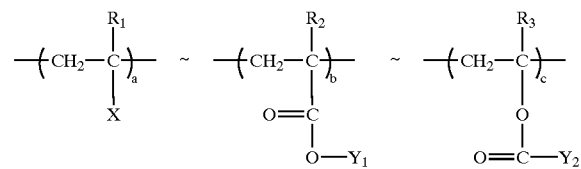

(3)

wherein X, $R_1$, $R_2$, and "~" are as defined in the formula (1), each of $Y_1$ and $Y_2$ is hydrogen, an alkyl group or an organic group having a functional group such as a vinyl group or an epoxy group, $R_3$ is hydrogen or an alkyl group, and each of a, b and c is a positive integer.

DETAILED DESCRIPTION OF THE INVENTION

The copolymer or polymer used in the present invention is those copolymers and polymers of the formulae (1) to (3). Examples of the copolymers and polymers of the formula (1) or the formula (2) include polymers or copolymers of acrylic acid ester, ethylene.acrylic acid ester, styrene.acrylic acid ester, methacrylic acid ester, ethylene.methacrylic acid ester, styrene.methacrylic acid ester, vinyl acetate, ethylene.vinyl acetate and styrene.vinyl acetate. Further, the above polymers and copolymers in which Y in the chemical formulae is an organic group having a functional group such as a vinyl group or an epoxy group, are included. Examples of multi-lateral copolymers of the formula (3) containing each monomer of the formula (1) and the formula (2) include an ethylene.vinyl acetate.acrylic acid ester multi-lateral polymer, a styrene.vinyl acetate.acrylic acid ester multi-lateral polymer, etc. Concerning the copolymers and polymers used in the present invention, polymers of the formula (1), the formula (2) and the formula (3) are arranged with a cationic, anionic or nonionic surfactant to be a particulate emulsion having a stable and proper viscosity, and a metal hydroxide is easily surface-treated with the emulsion.

As a surfactant used for obtaining an emulsion aqueous solution of a polymer, a hydrophilic surfactant having a polarity is preferred. The surfactant will be shown below.

Polyethers such as

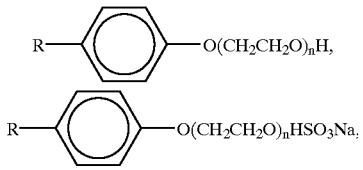

$(CH_2CH_2O)_nHSO_3Na$, $RO(CH_2CH_2O)_nH$, $RO(CH_2CH_2O)_nSO_3Na$, $RCOO(CH_2CH_2O)_nH$, $RCOO(CH_2CH_2O)COR$, $HO(C_2H_4O)_n(C_3H_6O)_m(C_2H_4O)_nH$ (in which R is an alkyl group of $C_8$ to $C_{17}$ and m and n are an integer.) are included in the example thereof.

When magnesium hydroxide is surface-treated with an emulsion of a copolymer or polymer, the amount of the emulsion based on the magnesium hydroxide is 0.01 to 20% by weight, preferably 0.1 to 15% by weight. When the amount of the emulsion is smaller than the lower limit of the above range, the improvement effects in productivity, water-resistance and acid-resistant are insufficient. When the amount of the emulsion is larger than the upper limit of the above range, the cost thereof increases so that it is poor in economic performance. The method of the surface-treatment is not specially limited. However, for example, when an emulsified polymer or copolymer is added to a magnesium hydroxide slurry and the mixture is stirred sufficiently, a treatment can be uniformly carried out.

The surface-treating agent used in the present invention includes surface-treating agents a: a silane-coupling agent, a titanate-coupling agent and an aluminate-coupling agent as a coupling agent, surface-treating agents b: stearic acid, oleic acid, palmitic acid, lauric acid, sodium salts of these and potassium salts of these as a higher fatty acid having a carbon atom number of 11–17 and/or its alkaline salt, and surface-treating agents c: stearyl alcohol phosphoric acid ester, lauric alcohol phosphoric acid ester, metal salts of these, and diethanol amine salt as a phosphoric acid ester. The amount of the surface-treating agent based on an inorganic compound is 0.01 to 10% by weight, preferably 0.01 to 5% by weight. The method of the surface-treatment is not specially limited. However, for example, when a treating agent is added to a magnesium hydroxide slurry and the mixture is stirred sufficiently, a uniform surface-treatment can be carried out. Further, the treatment with the surface-treating agent may be carried out before the treatment of the magnesium hydroxide with a copolymer or polymer emulsion, or the treatment of the magnesium hydroxide with a copolymer or polymer emulsion may be carried out before the treatment with the surface-treating agent.

The magnesium hydroxide used in the present invention may be a synthetic product or a natural product. These magnesium hydroxides may be used alone or in combination. The average particle diameter of these compounds is properly 20 $\mu$m or less, particularly properly 5 $\mu$m or less. The BET specific surface area thereof is properly 20 m$^2$/g or less, particularly properly 10 m$^2$/g or less. When either of these values excess the above upper limit thereof, it is impossible to obtain a fine molded article. As a metal hydroxide, a metal hydroxide having a well-grown crystal and having little aggregation is preferred.

The resin composition of the present invention is a flame-retardant resin composition which is obtained by incorporating 10 to 300 parts by weight of the flame-retardant of the present invention per 100 parts by weight of a synthetic resin and is excellent in processability, water-resistance and acid-resistance. When the amount of the flame-retardant is smaller than 10 parts by weight, the resin composition is decreased in flame-retardancy. When the amount of the flame-retardant is larger than 300 parts by weight, the resin composition is decreased in mechanically physical properties.

The synthetic resin used for the flame-retardant resin composition of the present invention is a thermoplastic resin and a thermosetting resin which can be processed by means of molding. Examples of these resins include olefin polymers or copolymers such as polyethylene, polypropylene, polybutene-1, poly-4-methylpentene, an ethylene.propylene copolymer, an ethylene.butene-1 copolymer, an ethylene.4-methylpentene copolymer, a propylene.butene-1 copolymer, a propylene.4-methylpentene-1 copolymer, an ethylene-.acrylic acid ester copolymer and an ethylene.propylene.diene copolymer; styrene polymers or copolymers such as polystyrene, ABS, AA, AES and AS; vinyl chloride-containing or vinyl acetate-containing polymer or copolymers such as a vinyl chloride resin, a vinyl acetate resin, a vinylidene chloride resin, an ethylene.vinyl chloride copolymer and an ethylene.vinyl acetate copolymer; a phenoxy resin, a butadiene resin, fluoroplastic, a polyacetal resin, a polyamide resin, a polyurethane resin, a polyester resin, a polycarbonate resin, a polyketone resin, a methacrylic resin, a diallyl phthalate resin, a phenol resin, an epoxy resin, a melamine resin, a urea resin; or rubbers such as SBR, BR, CR, CPE, CSM, NBR, IR, IIR and fluororubber.

The flame-retardant resin composition of the present invention may contain any additive other than the flame-retardant. Examples thereof include an antioxidant, an ultraviolet absorbent, an antistatic agent, a lubricant, a stabilizer, a pigment, a foaming agent, a plasticizer, a filler, an acid acceptor, a reinforcement material, a flame retardant aid such as an organic halogen flame-retardant, antimony trioxide, carbon black, tin, a tin compound, phosphorus and a phosphorus compound, and a crosslinking agent.

The flame-retardant cable of the present invention is a flame-retardant cable in which an electrical conductor is covered with an insulation layer directly or through another layer or in which the circumference of the above insulation layer is covered with a sheath layer through further another layer or through no layer, which cable is characterized in that at least one layer of the insulation layer or the sheath layer is composed of the above flame-retardant resin composition. Examples of the flame-retardant cable include electric wires for industrial devices such as electronic devices and motor vehicles and electric wires used for home electric appliances, indoor wiring and communication cables.

EXAMPLES

The present invention will be explained more specifically with reference to Examples hereinafter, while the present invention shall not be limited to these Examples. In Examples and Comparative Examples, "%" stands for "% by weight" unless otherwise specified.

EXAMPLE 1

5 kg of a magnesium hydroxide (BET specific surface area: 6 m$^2$/g, an average particle diameter: 0.80 $\mu$m) was uniformly dispersed in 50 liters of water with a stirrer. Then, to the resultant mixture was added a styrene.ethyl acrylate copolymer emulsion having a temperature of 80 ° C. in an amount of 25 g, which corresponded to 0.5% based on the amount of the magnesium hydroxide, and the resultant mixture was fully stirred. Then, the mixture was dehydrated, dried and pulverized.

150 parts by weight of the surface-treated magnesium hydroxide, 100 parts by weight of an ethylene.ethyl acrylate copolymer resin and 1 part by weight of antioxidant were mixed, then the mixture was kneaded with an extruder, a screen pack (each one sheet of 200, 100, 80, and 60 meshes) was placed in a die portion, and a pressure was measured when a melt resin composition passed therethrough. A resistance to be exerted increased with decreasing processability so that the pressure exerted at a time of passing through the screen pack was increased. Table 1 shows the results.

EXAMPLES 2 and 3

The same measurements as that in Example 1 were carried out except that the amount of the surface-treating agent based on the magnesium hydroxide was changed to the amounts shown in Table 1. Table 1 shows the results.

EXAMPLE 4

The same measurement as that in Example 1 was carried out except that an ethylene.ethyl acrylate copolymer (1.0% based on the magnesium hydroxide) and oleic acid (1.0% based on the magnesium hydroxide) were used as a surface-treating agent. Table 1 shows the results.

Comparative Example 1

The same measurement as that in Example 1 was carried out except that a magnesium hydroxide which was not treated was used. Table 1 shows the results.

Comparative Example 2

The same measurement as that in Example 1 was carried out except that oleic acid in an amount shown in Table 1 was used as a surface-treating agent. Table 1 shows the results.

TABLE 1

Test results of screen-mesh passing-properties

| | Kind of a surface-treating agent | Amount (%) | Pressure of a resin (kg/cm$^2$) |
|---|---|---|---|
| Example 1 | Styrene-ethyl acrylate copolymer | 0.5 | 74 |
| Example 2 | Styrene-ethyl acrylate copolymer | 1.0 | 65 |
| Example 3 | Styrene-ethyl acrylate copolymer | 2.0 | 58 |
| Example 4 | Styrene-ethyl acrylate copolymer, oleic acid | 1.0, 1.0 | 59 |
| Comparative Example 1 | No treatment | 0.0 | 94 |
| Comparative Example 2 | Oleic acid | 1.0 | 82 |

EXAMPLE 5

5 kg of a magnesium hydroxide (BET specific surface area: 6.5 m$^2$/g, an average particle diameter: 0.78 μm) was uniformly dispersed in 50 liters of water with a stirrer. Then, to the resultant mixture was added an ethylene.ethyl acrylate copolymer emulsion having a temperature of 80° C. in an amount of 500 g, which corresponded to 10% based on the amount of the magnesium hydroxide, and the resultant mixture was fully stirred. Then, the mixture was dehydrated, dried and pulverized.

100 parts by weight of the surface-treated magnesium hydroxide, 90 parts by weight of polypropylene and 10 parts by weight of polypropylene color master patch (blue color) were mixed, and then the mixture was kneaded with an extruder to prepare a pellet. The pellet was injection-molded to prepare a test piece (40 mm×50 mm×2 mm). The test piece was placed in a desiccator, 35 wt % hydrochloric acid in an amount of 1 ml was dropped on the test piece, and after 24 hours passed, the surface was observed. As the acid-resistance of magnesium hydroxide decreased, the test piece was more highly affected with the acid so that the surface thereof was whitened. As a result, a color difference between before the test and after the test, i.e., ΔE was increased. The above color change was measured with a color difference meter ("ZE-2000", supplied by Nippon Denshoku Kogyo K.K.). Further, a test piece for a UL flame-retardancy test was prepared by injection molding, and the flame-retardancy test was carried out. Table 2 shows the results thereof.

EXAMPLE 6

A test piece was prepared and tested in the same manner as in Example 5 except that a magnesium hydroxide surface-treated with an emulsion of an ethylene.vinyl acetate copolymer (7% based on the magnesium hydroxide) and a lauryl alcohol phosphoric acid ester (3% based on the magnesium hydroxide) was used. Table 2 shows the results thereof.

Comparative Example 3

A test piece was prepared and tested in the same manner as in Example 5 except that the surface-treating agent was replaced with stearic acid. Table 2 shows the results thereof.

TABLE 2

| | | Example 5 | Example 6 | Comparative Example 3 |
|---|---|---|---|---|
| Before dropping | L | 56.73 | 59.21 | 60.59 |
| | a | 1.82 | 1.50 | 2.35 |
| | b | −26.28 | −26.58 | −29.61 |
| After dropping | L | 76.66 | 79.39 | 83.48 |
| | a | −0.11 | 0.18 | 0.45 |
| | b | −9.06 | 0.18 | −7.45 |
| | ΔE | 26.41 | 27.44 | 31.92 |
| Flame-retardancy test, 94HB method | | pass | pass | pass |

EXAMPLE 7

5 kg of a magnesium hydroxide (BET specific surface area: 6.8 m$^2$/g, an average particle diameter: 0.83 μm) was uniformly dispersed in 50 liters of water with a stirrer. Then, to the resultant mixture was added a methyl methacrylate polymer emulsion having a temperature of 80° C. in an amount of 50 g, which corresponded to 1.5% based on the amount of the magnesium hydroxide, and the resultant mixture was fully stirred. Then, the mixture was dehydrated, dried and pulverized.

180 parts by weight of the surface-treated magnesium hydroxide, 100 parts by weight of an ethylene-vinyl acetate copolymer resin, 1 part of an antioxidant and 1 part of a crosslinking agent were mixed, and then the mixture was kneaded with an extruder to prepare a pellet. The pellet was molded in the form of a sheet, and then cross-linked. The so-obtained sheet (95 mm×95 mm×2 mm) was immersed in ion-exchanged water, the sheet was allowed to stand at 70° C. for 168 hours, and then, the sheet was measured for a volume resistivity with a vibrating reed electrometer ("TR 8401", supplied by Takeda Riken kogyo K.K.). The water absorption of the sheet increased with decreasing the water resistance of the magnesium hydroxide. Consequently, the volume resistivity decreased. Further, a test piece for a UL flame-retardancy test was prepared, and the flame-retardancy test was carried out. Table 2 shows the results thereof.

EXAMPLE 8

A test piece was obtained and tested in the same manner as in Example 7 except that magnesium hydroxide was surface-treated with sodium oleate (0.5% based on the magnesium hydroxide) and an emulsion of a methyl methacrylate polymer (1.0% based on the magnesium hydroxide). Table 3 shows the result thereof.

Comparative Examples 4 to 6

Test pieces were obtained and tested in the same manner as in Example 7 except that magnesium hydroxide was surface-treated with sodium stearate (3% based on the magnesium hydroxide) in Comparative Example 4, that magnesium hydroxide was surface-treated with sodium oleate (3% based on the magnesium hydroxide) in Comparative Example 5 and that magnesium hydroxide was surface-treated with a vinyl silane coupling agent (3% based on the magnesium hydroxide) in Comparative Example 6. Table 3 shows the result thereof.

TABLE 3

Test results of water resistance and flame-retardancy

| | Example 7 | Example 8 | C Ex. 4 | C Ex. 5 | C Ex. 6 |
|---|---|---|---|---|---|
| Surface-treating agent | A | B, A | C | B | D |
| Amount (%) | 1.5 | B: 0.5 A: 1.0 | 3.0 | 3.0 | 3.0 |
| volume resistivity | $1.9 \times 10^{14}$ | $1.3 \times 10^{14}$ | $4.7 \times 10^{13}$ | $2.3 \times 10^{13}$ | $5.5 \times 10^{13}$ |
| Flame-retardancy, UL-94V | V-0 | V-0 | V-0 | V-0 | V-0 |

Symbols:
A: methyl methacrylate polymer
B: sodium oleate
C: sodium stearate
D: vinyl silane coupling agent Effect of the Invention According to the present invention, there is provided a flame-retardant which can give a flame-retardant resin composition excellent in processability, water resistance and acid resistance, a flame-retardant resin composition containing said flame-retardant and a flame-retardant cable utilizing said flame-retardant resin composition.

What is claimed is:

1. A flame-retardant powder for a synthetic resin, which is obtained by surface-treating magnesium hydroxide with 0.1 to 20% by wt. of an emulsion of a copolymer or polymer of the formula (1),

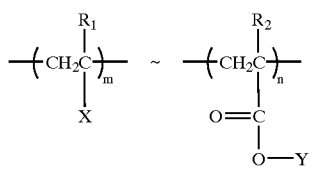

(1)

wherein X is any one of hydrogen, a phenyl group and an alkyl phenyl group, Y is hydrogen, an alkyl group or an organic group having a vinyl or epoxy group, each of $R_1$ and $R_2$ is hydrogen or an alkyl group, m is 0 or a positive integer, n is a positive integer, and "~" shows that each monomer is copolymerized at random in a main chain, the formula (2)

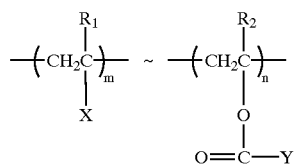

(2)

wherein X is any one of hydrogen, a phenyl group and an alkyl phenyl group, Y is hydrogen, an alkyl group or an organic group having a vinyl or epoxy group, each of $R_1$ and $R_2$ is hydrogen or an alkyl group, m is 0 or a positive integer, n is a positive integer, and "~" shows that each monomer is copolymerized at random in a main chain, or the formula (3),

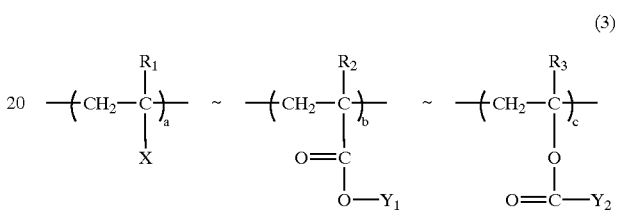

(3)

wherein X is any one of hydrogen, a phenyl group and an alkyl phenyl group, each of $Y_1$ and $Y_2$ is hydrogen, an alkyl group or an organic group having a vinyl or epoxy group, each of $R_1$, $R_2$ and $R_3$ is hydrogen or an alkyl group, each of a, b and c is a positive integer, and "~" shows that each monomer is copolymerized at random in a main chain, and then dehydrating, drying and pulverizing the surface-treated magnesium hydroxide.

2. The flame-retardant powder according to claim 1, wherein the magnesium hydroxide is surface-treated with 0.01 to 10% by wt. of at least one surface-treating agent selected from the group consisting of the following a, b and c,
   a. a coupling agent
   b. a higher fatty acid having a carbon atom number of 11–17 and/or its alkali metal salt, and
   c. a phosphoric acid ester.

3. A flame-retardant resin composition which is obtained by incorporating 10 to 300 parts by weight of the flame-retardant powder recited in claim 1 per 100 parts of a synthetic resin.

4. A molded article obtained from the flame-retardant resin composition recited in claim 3.

5. A flame-retardant cable in which an electrical conductor is covered with an insulation layer directly or through another layer or in which the circumference of the above insulation layer is covered with a sheath layer through further another layer or through no layer,
   wherein at least one layer of the insulation layer or the sheath layer is composed of the molded article recited in claim 4.

* * * * *